United States Patent
Thompson

(10) Patent No.: US 8,690,246 B2
(45) Date of Patent: Apr. 8, 2014

(54) RECLINING SEAT

(75) Inventor: James Thompson, Kilkeel (GB)

(73) Assignee: J. Thompson Solutions Limited, County Down (GB)

( * ) Notice: Subject to any disclaimer, the term of this patent is extended or adjusted under 35 U.S.C. 154(b) by 431 days.

(21) Appl. No.: 12/935,360

(22) PCT Filed: Mar. 26, 2009

(86) PCT No.: PCT/EP2009/002227
§ 371 (c)(1),
(2), (4) Date: Dec. 27, 2010

(87) PCT Pub. No.: WO2009/121520
PCT Pub. Date: Oct. 8, 2009

(65) Prior Publication Data
US 2011/0109140 A1  May 12, 2011

(30) Foreign Application Priority Data
Mar. 31, 2008 (GB) .................................. 0805747.3

(51) Int. Cl.
*A47C 1/023* (2006.01)

(52) U.S. Cl.
USPC ........................... 297/337; 297/331; 297/318

(58) Field of Classification Search
USPC .......................... 297/337, 313, 317, 318, 331
See application file for complete search history.

(56) References Cited

U.S. PATENT DOCUMENTS

| 4,432,524 | A  | * | 2/1984 | Wize | 297/318 X |
| 6,058,798 | A  | * | 5/2000 | Lantzsch | 297/337 X |
| 6,742,840 | B2 | * | 6/2004 | Bentley | 297/317 X |
| 6,916,057 | B2 | * | 7/2005 | Teich | 297/337 X |
| 2003/0085602 | A1 | | 5/2003 | Ogino et al. | |

FOREIGN PATENT DOCUMENTS

| DE | 19742773 | 4/1999 |
| EP | 1571037 | 9/2005 |
| GB | 1060383 | 3/1967 |
| GB | 2429908 | 1/2008 |

* cited by examiner

Primary Examiner — Anthony D Barfield
(74) Attorney, Agent, or Firm — Porter, Wright, Morris & Arthur, LLP

(57) ABSTRACT

A reclining seat comprising a seat base (10) and a backrest (11), wherein the seat base is mounted on a support structure moveable along at least one guide path (16, 17) whereby the seat base is moveable between upright and reclined use or seating positions and a retracted state, control means being provided for controlling movement of the seat base along said at least one guide path, preferably with infinite adjustment, between said upright and reclined seating positions.

18 Claims, 4 Drawing Sheets

RECLINING SEAT

The present invention relates to reclining seats, especially for vehicles and most particularly for aircraft.

Conventional reclining seats have a seat base and a backrest and are operable between an upright state, in which the seat base and the back rest adopt a first orientation relative to one other, and a reclined state in which the seat base and the backrest adopt a second orientation with respect to one another. In each state, the respective profiles of the seat base and backrest remain the same.

However, the distribution of the seat occupant's weight differs between the upright and reclined states. It is considered, therefore, that the profile of at least the backrest or back support area connected to the translation of the seat base should be adaptable to accommodate varying weight distributions.

GB 2,429,908 a reclining seat comprising a generally rigid outer shell 18 containing a seat base 16 and a back rest 14. The seat base and back rest are coupled together for movement with respect to the shell from an upright state to a reclined state by guided forward sliding movement of the seat base and corresponding downward movement of the top edge of the back rest. Adjustment of the seat base and back rest between the upright and reclined states is provided by means of a ratchet and pawl arrangement defining a number of discrete positions between said upright and reclined states. The pawl may be disengaged from the ratchet by pulling upwardly on a bar 62, against the bias of a spring 66. While this arrangement provides a number of advantages over other reclining seats, adjustment of the seat requires the user to reach underneath the seat, pull up on the bar 62 and physically slide the seat base to the required location, requiring considerable dexterity and strength on the part of the user. Furthermore, such arrangement only provides a discrete number of fixed positions and thus the user may not be able to find the ideal seating position.

According to the present invention there is provided a reclining seat comprising a seat base and a backrest, wherein the seat base is mounted on a support structure moveable along at least one guide path whereby the seat base is moveable between upright and reclined positions and between a use state and a retracted state, control means being provided for controlling movement of the seat base along said at least one guide path, preferably with infinite adjustment, between said upright and reclined seating positions.

Preferably the control means is adapted to enable the seat base to be translated towards its upright position along said at least one guide path without requiring actuation of a user control interface associated with the control means, such as a lever or button or other actuation member, while preventing the seat base from being translated towards its reclined position without actuation of said user control interface.

In one embodiment, said control means comprises at least one rotary member rotatably mounted on the support structure and arranged to roll along said at least one guide path, locking means being provided for selectively preventing rotation of said rotary member in at least one direction and actuation means permitting manual release of the locking means to permit rotation of the rotary member and thus adjustment of the seat base. Preferably said locking means comprises a clutch mechanism for selectively locking the rotary member against rotation.

Preferably said at least one rotary member is mounted upon a shaft, said shaft being rotatably mounted upon said support structure, said locking means acting upon said shaft to selectively prevent rotation of the shaft in said at least one direction.

In one embodiment, the locking means may comprise an elongate member wrapped around said shaft and having one end fixed to said support structure to permit the shaft to rotate in a first direction when the at least one rotary member moves along said at least one guide means in a direction corresponding to the translation of the seat base towards its upright position, application of a torque on the shaft in a second, opposite direction causing the elongate member to tighten around the shaft, thus preventing the shaft from rotating in said second direction to prevent translation of the seat base towards its reclined position, said actuation means acting on the free end of the elongate member to release the grip of the elongate member on the shaft.

The at least one rotary member may comprise a gear wheel, said at least one guide path comprising a rack whereby said gear wheel meshes with said rack.

The actuation means may comprise a release button provided on a user accessible location operatively connected to said actuation means by a mechanical linkage, such as a cable or rod, or by an electrical connection, said actuation means comprises an electrical actuator, such as a solenoid.

A damping device may be operably connected to the rotary member to dampen rotation of the rotary member and thus dampen movement of the seat base between its upright and reclined positions.

Preferably the control means is adapted to enable the seat base to be translated towards its upright position along said at least one guide path without requiring actuation of a user control interface associated with the control means, such as a lever or button or other actuation member, while preventing the seat base from being translated towards its reclined position without actuation of said user control interface.

Preferably the seat base and back rest are coupled together for movement with respect to a generally rigid outer shell, containing the seat base and back rest, from the upright state to the reclined state by forward sliding movement of the seat base and corresponding downward movement of the top edge of the back rest. In one embodiment, the back rest may be rotatable about a substantially horizontal axis which is slidable along a first downwardly and forwardly extending guide path when the seat base moves from the upright state to the reclined state and wherein the seat base support structure is slideable along both the first guide path and a second downwardly and forwardly extending guide path when the seat moves from the upright state to the reclined state, and wherein the second guide path makes a lesser angle to the horizontal than the first guide path whereby the forward sliding movement of the seat base is accompanied by a slight downward tilting of the rear of the seat base, said control means being associated with at least one of said first and second guide paths. Preferably the support structure comprises first and second link members each pivoted at one end to the underside of the seat base at respective locations spaced in the front-to-rear direction of the seat, the other ends of the link members being pivotable at respective locations a fixed distance apart and slidable along the first and second guide paths respectively.

Where the control means comprises a gear wheel and rack, said rack may be provided on one of said first and second guide paths.

In one embodiment, the support structure comprises first and second link members each pivoted at one end to the underside of the seat base at respective locations spaced in the front-to-rear direction of the seat, the other ends of the link members being pivotable at respective locations a fixed distance apart and slidable along the first and second guide paths respectively.

The back rest may comprise a flexible diaphragm.

Embodiments of the invention will now be described, by way of example, with reference to the accompanying drawings, in which.

Figure 1:
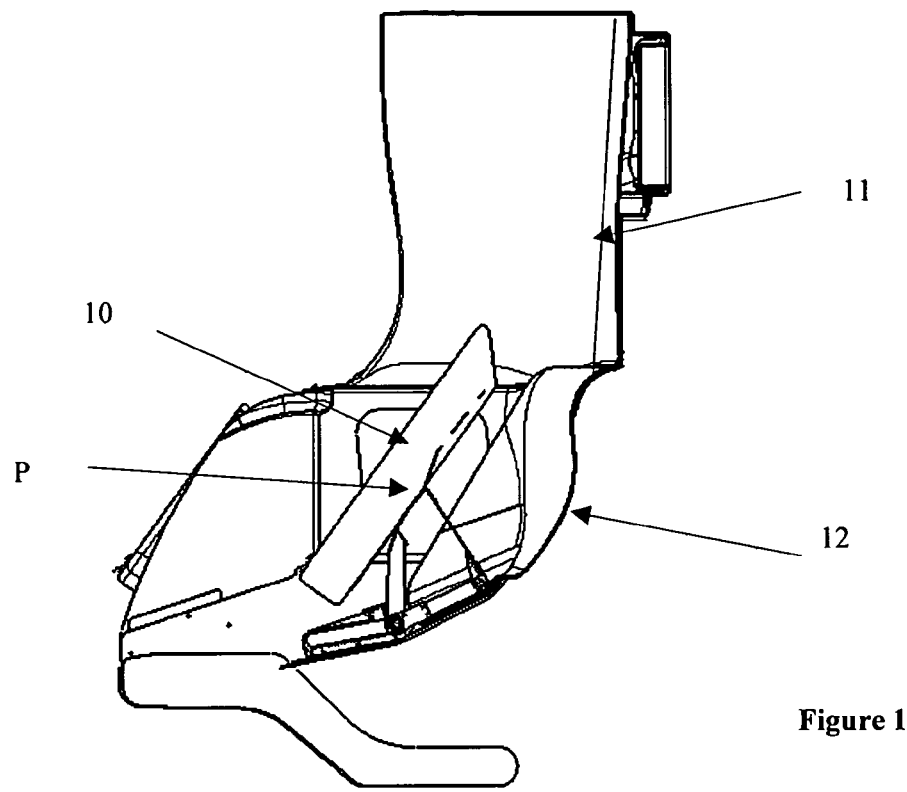
FIG. 1 is a side view of a seat embodying the invention.
Figure 2:
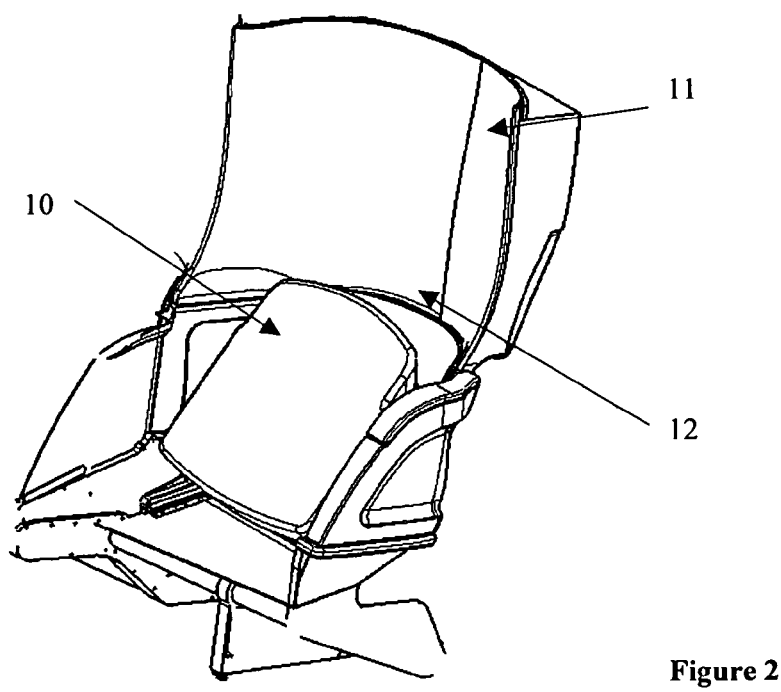
FIG. 2 is a isometric overview of a seat embodying the invention.
Figure 5:
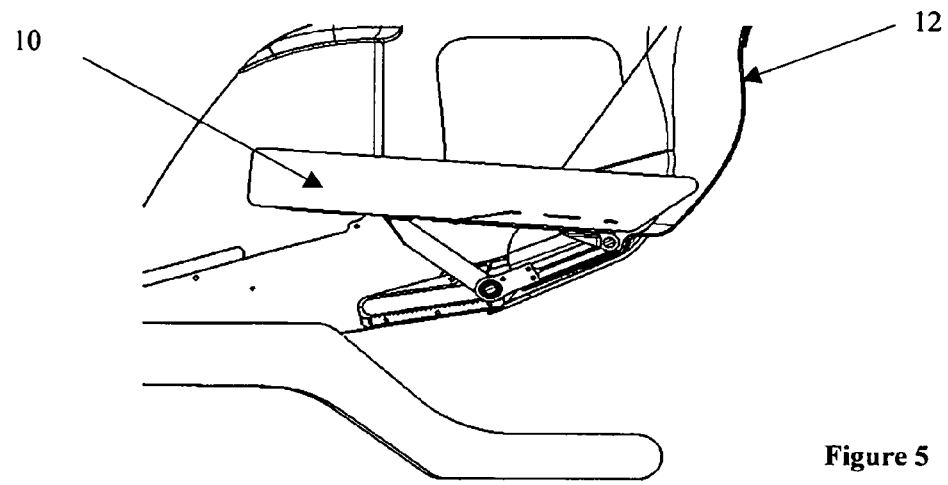
FIG. 5 is a section schematic of the mechanism in the in upright and in use state.
Figure 6:
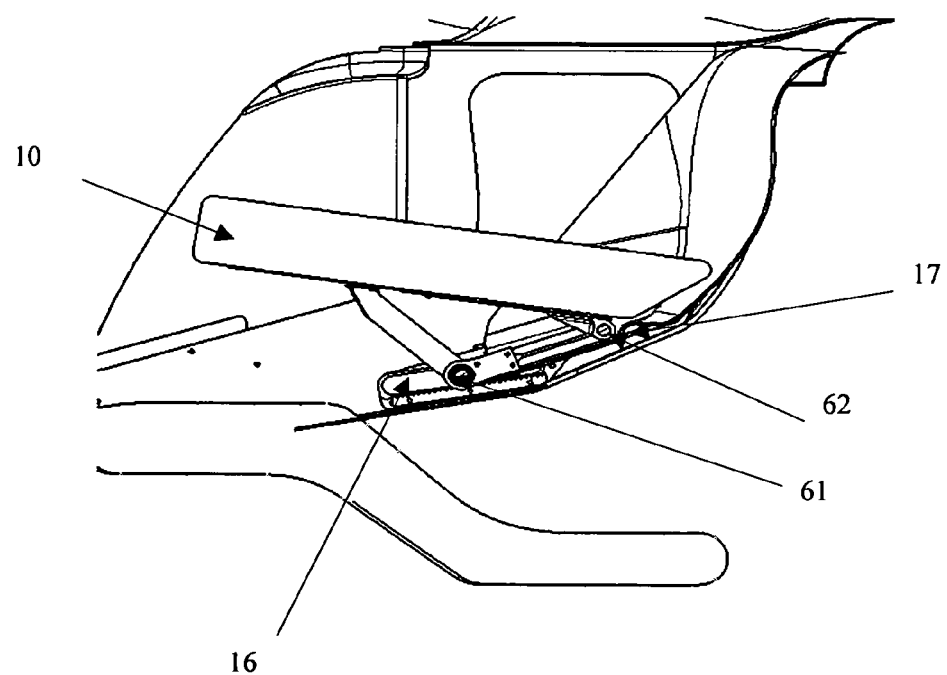
FIG. 6 is a section schematic of the mechanism in the semi-reclined position.

FIGS. 1 and 2 show views of a seat embodying the invention. FIGS. 5 to 6 depicts the seat base (10), the backrest (11) and the lower back support (12) in an upright, semi-reclined and retracted state respectively. The retracted state is achieved by incorporating a resilient return device about pivot point P, such that the device applies a torsional force. This may be aided by or replaced by a linear return device. The backrest (11) and lower back support (12) comprise a flexible or semi rigid sheet, panel or other diaphragm material arranged to flex and support the occupants' weight. When not in use, the seat base and lower back support are retracted to increase space between rows of seats. The seat base (10), backrest (11) and lower back support (12) are padded and upholstered respectively. The seat base (10) consists of semi-rigid material such as thin sheet metal or plastic such that it supports with some flexure the occupant's weight. This thin sheet metal or plastic is linked and pivoted through the plurality of links allowing the seat base (10) and lower back support (12) to take two independent orientations when in use and retracted [relative to the backrest (11)].

Figure 3:
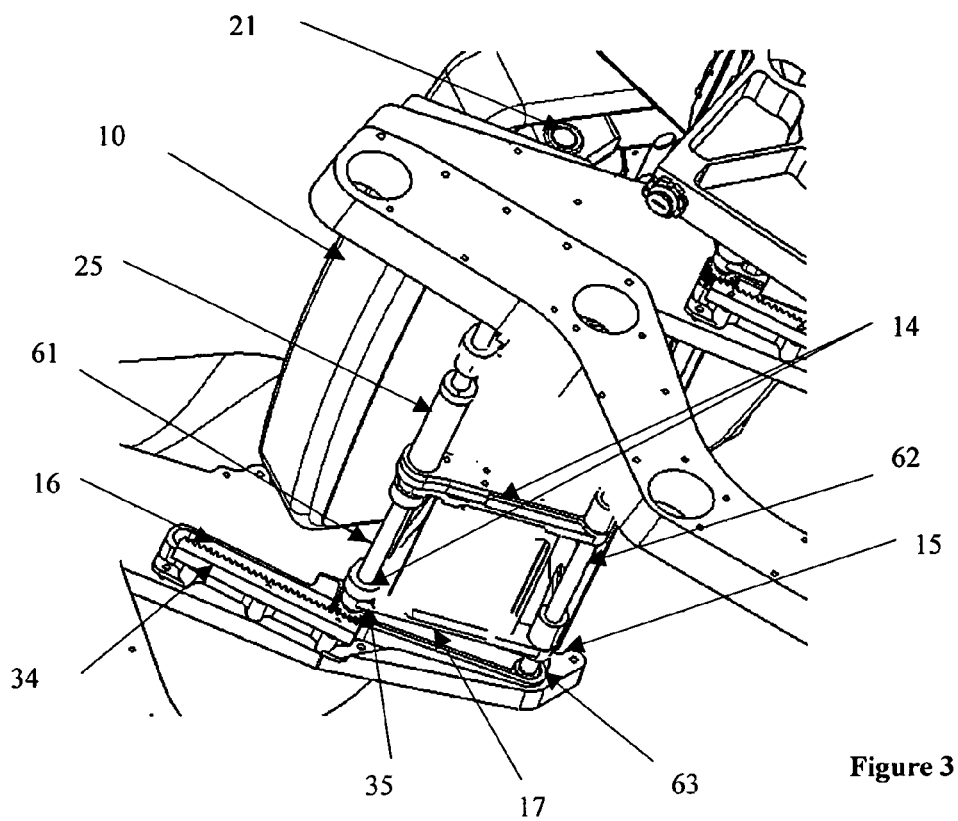
FIG. 3 is a schematic view of the seat mechanism.

FIG. 3 shows a seat mechanism in an upright retracted state in which the seat base (10) and lower back support (12) adopt a first orientation relative to the backrest (11). A resilient return device (25) may be incorporated about pivot or shaft (61 or 62) forcing the retracted state if required. The seat base (10) and lower back support (12) may independently be biased in position relative to guide slots (16 and 17) located in the seat base structure (15) using a resilient return device. Such a device may be connected directly to the 'driving' shaft which may be either the forward (61) or aft (62) shafts as required—providing a torsional return force. A linear device may also independently be incorporated. The shafts (61 and 62) are connected pivotally to the seat base structure (14) and translate along the paths depicted by suitable guides such as those shown (16 and 17). A bearing material (63) or slide can be attached to the ends of each shaft to ensure lowered resistance if required.

Figure 4:
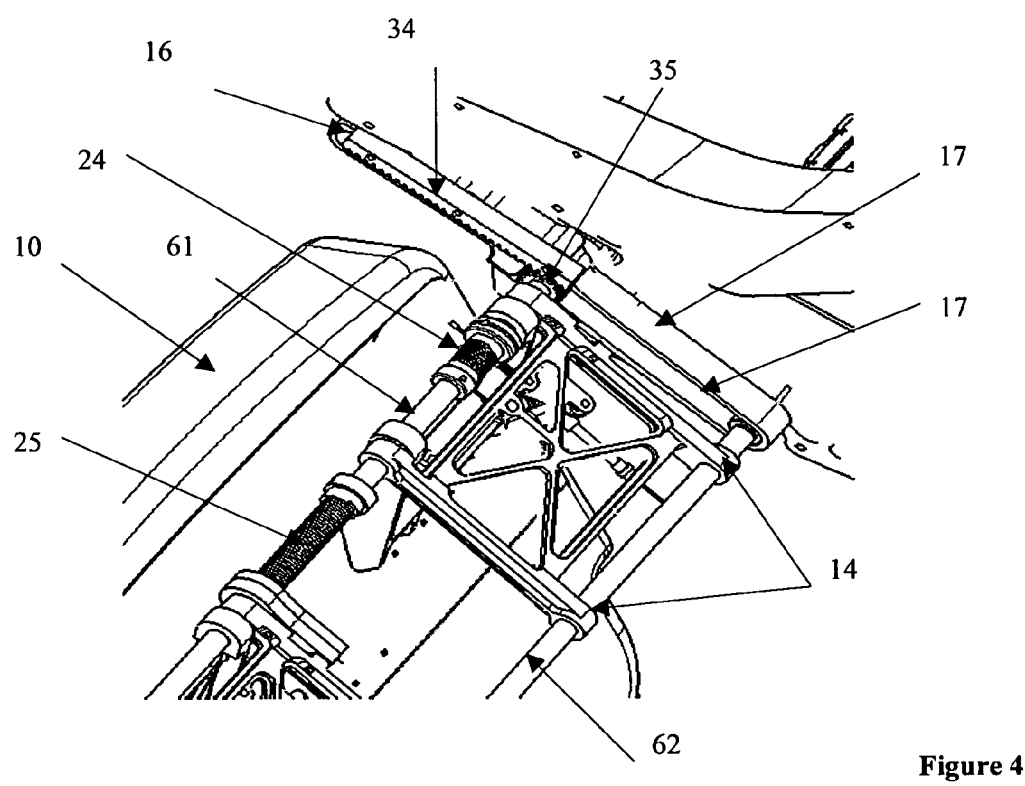
FIG. 4 is a schematic view of the seat mechanism.

FIG. 4 shows a view of the seat pan mechanism. The state of the mechanism position is infinitely variable being controlled by a clutching mechanism such as a spring gripping a shaft or similar non-ratcheting lock (24) attached to either or both shafts (61 and 62) and to the seat pan structure (14). Any position between the two predefined states of upright and reclined can be reached by travelling along a linear or non linear path followed by rollers, bearings, slides or similar guides for which the path has been predetermined for example shown by the grooves (16 and 17 respectively). The torsional force applied by the lock (24) is transmitted through gears (35) attached to one end, both ends and indeed one or both of the shafts (61 and 62). This force is translated to the seat base structure through a rack (34) or combination of such which is/are rigidly connected to the seat base structure (15). In order to recline the seat base (10) and lower back support (12), the locking mechanism (24) is clutched or unlocked by using a levered mechanism or button interface (21—depicted in FIG. 3) connected by mechanical cable, links or electronic controls to the locking mechanism (24). A similar or indeed the same system can be used if required to control the movement of the seat base (10) between reclined and upright state. Dependant upon requirements, the spring clutch or locking mechanism (24) can be designed such that it will only lock in a single direction such that the seat base (10) and lower back support (12) can translate along the predefined path by exerting light force in a single direction, whether exerted by the occupant or by a biased resilient return device (25)—without interacting further with the control interface (21). Such a resilient return device could be incorporated on the shaft (61 and 62) joining the pinion gears (35) and allowing a torsional return force to be applied. A similar force could be applied using a linear device connected to the support structure (14) and seat base frame (15). Damped translation from upright to recline state and vice versa can be achieved by incorporating a rotary damper rigidly held to the support structure (14) and rotating along the rack (34) or indeed a supplementary rack system. Similar damping can be achieved using a linear device connected to the support structure (14) and seat base frame (15).

FIG. 5 shows the seat in an upright—with the seat base (10) and lower back support (12) in the in-use state.

FIG. 6 shows the seat mechanism in an in use and partially reclined position in that the shafts (61 and 62) are in an intermediate position of travel along the guides (16 and 17).

Figure 7:
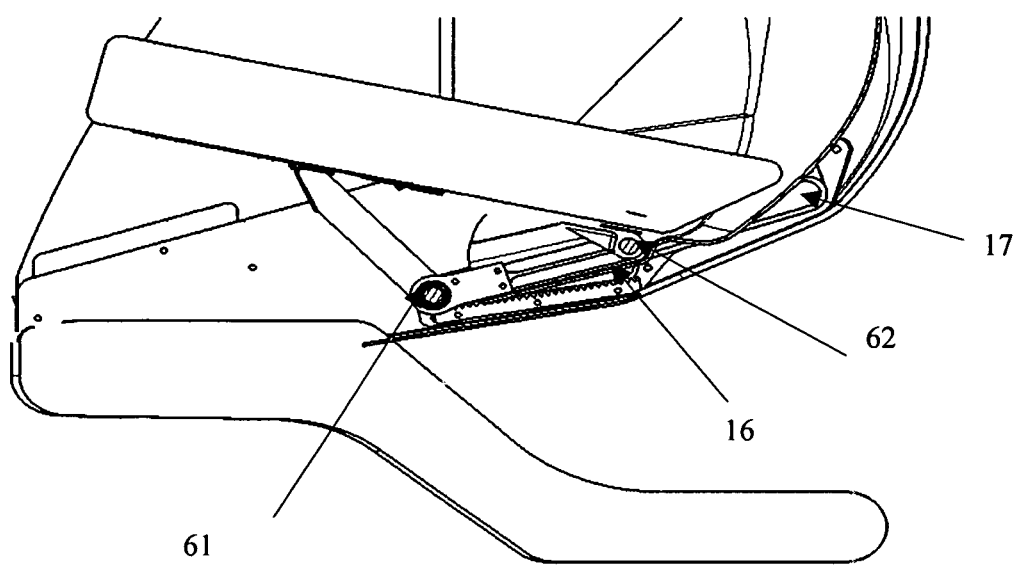
FIG. 7 is a section schematic of the mechanism in the fully reclined position.

FIG. 7 shows the seat mechanism in an in use and fully reclined position in that the shafts (61 and 62) are at a predefined end position of travel along the guides (16 and 17).

The invention claimed is:

1. A reclining seat comprising a seat base and a backrest, wherein the seat base is mounted on a support structure moveable along at least one guide path whereby the seat base is moveable between upright and reclined positions and between a use state and a retracted state, a control device being provided for controlling movement of the seat base along said at least one guide path between said upright and reclined seating positions, said control device providing infinite adjustment of the seat base along said at least one guide path between said upright and reclined seating positions, wherein said control device comprises at least one rotary member rotatably mounted on the support structure and arranged to roll along said at least one guide path, a locking device configured to prevent rotation of said rotary member in at least one direction and thus prevent manual adjustment of the seat base by an occupant in the at least one direction when locked and to permit rotation of said rotary member in the at least one direction and thus permit manual adjustment of the seat base by the occupant in the at least one direction when released, wherein said locking device comprises a clutch mechanism for selectively locking the at least one rotary member against rotation, and an actuation device configured to release the locking device to permit rotation of the rotary member and thus permit manual adjustment of the seat base by the occupant in the at least one direction upon selective manual actuation of the actuation device by the occupant.

2. A seat as claimed in claim 1, wherein said at least one rotary member is mounted upon a shaft, said shaft being rotatably mounted upon said support structure, said locking device acting upon said shaft to selectively prevent rotation of the shaft in said at least one direction.

3. A seat as claimed in claim 2, wherein said locking device comprises an elongate member wrapped around said shaft and having one end fixed to said support structure to permit the shaft to rotate in a first direction when the at least one rotary member moves along said at least one guide path in a direction corresponding to the translation of the seat base towards its upright position, application of a torque on the shaft in a second, opposite direction causing the elongate member to tighten around the shaft, thus preventing the shaft from rotating in said second direction to prevent translation of the seat base towards its reclined position, said actuation device acting on the free end of the elongate member to release the grip of the elongate member on the shaft.

4. A seat as claimed in claim 2, wherein the at least one rotary member comprises a gear wheel, said at least one guide path comprising a rack whereby said gear wheel meshes with said rack.

5. A seat as claimed in claim 1, wherein said actuation device comprises a release button provided on a user accessible location operatively connected to said actuation device by a mechanical linkage or by an electrical connection, said actuation device comprises an electrical actuator, such as a solenoid.

6. A seat as claimed in claim 1, wherein a damping device is operably connected to the rotary member to dampen rotation of the rotary member and thus dampen movement of the seat base between its upright and reclined positions.

7. A seat as claimed in claim 1, wherein the control device is adapted to enable the seat base to be translated towards its upright position along said at least one guide path without requiring actuation of a user control interface associated with the device, while preventing the seat base from being translated towards its reclined position without actuation of said user control interface.

8. A seat as claimed in claim 1, wherein the seat base and back rest are coupled together for movement with respect to a generally rigid outer shell, containing the seat base and back rest, from the upright state to the reclined state by forward sliding movement of the seat base and corresponding downward movement of the top edge of the back rest.

9. A seat as claimed in claim 8, wherein the back rest is rotatable about a substantially horizontal axis which is slidable along a first downwardly and forwardly extending guide path when the seat base moves from the upright state to the reclined state and wherein the seat base support structure is slideable along both the first guide path and a second downwardly and forwardly extending guide path when the seat moves from the upright state to the reclined state, and wherein the second guide path makes a lesser angle to the horizontal than the first guide path whereby the forward sliding movement of the seat base is accompanied by a slight downward tilting of the rear of the seat base, said control device being associated with at least one of said first and second guide paths.

10. A seat as claimed in claim 9, wherein the support structure comprises first and second link members each pivoted at one end to the underside of the seat base at respective locations spaced in the front-to-rear direction of the seat, the other ends of the link members being pivotable at respective locations a fixed distance apart and slidable along the first and second guide paths respectively.

11. A seat as claimed in claim 1, wherein the back rest comprises a flexible diaphragm.

12. A reclining seat comprising a seat base and a backrest, wherein the seat base is mounted on a support structure moveable along at least one guide path whereby the seat base is moveable between upright and reclined positions and between a use state and a retracted state, a control device being provided for controlling movement of the seat base along said at least one guide path between said upright and reclined seating positions, said control device providing infinite adjustment of the seat base along said at least one guide path between said upright and reclined seating positions, wherein said control device comprises at least one rotary member rotatabiy mounted on the support structure and arranged to roll along said at least one guide path, a locking device configured to prevent rotation of said rotary member in at least one direction and thus prevent manual adjustment of the seat base by an occupant in the at least one direction when locked and to permit rotation of said rotary member in the at least one direction and thus permit manual adjustment of the seat base by the occupant in the at least one direction when released, and an actuation device configured to release the locking device to permit rotation of the rotary member and thus permit manual adjustment of the seat base by the occupant in the at least one direction upon selective manual actuation of the actuation device by the occupant, and wherein said at least one rotary member is mounted upon a shaft, said shaft being rotatably mounted upon said support structure, said locking device acting upon said shaft to selectively prevent rotation of the shaft in said at least one direction.

13. A seat as claimed in claim 12, wherein said locking device comprises an elongate member wrapped around said shaft and having one end fixed to said support structure to permit the shaft to rotate in a first direction when the at least one rotary member moves along said at least one guide path in a direction corresponding to the translation of the seat base towards its upright position, application of a torque on the shaft in a second, opposite direction causing the elongate member to tighten around the shaft, thus preventing the shaft from rotating in said second direction to prevent translation of the seat base towards its reclined position, said actuation device acting on the free end of the elongate member to release the grip of the elongate member on the shaft.

14. A seat as claimed in claim 12, wherein the at least one rotary member comprises a gear wheel, said at least one guide path comprising a rack whereby said gear wheel meshes with said rack.

15. A reclining seat comprising a seat base and a backrest, wherein the seat base is mounted on a support structure moveable along at least one guide path whereby the seat base is moveable between upright and reclined positions and between a use state and a retracted state, a control device being provided for controlling movement of the seat base along said at least one guide path between said upright and reclined seating positions, said control device providing infinite adjustment of the seat base along said at least one guide path between said upright and reclined seating positions, wherein said control device comprises at least one rotary member rotatably mounted on the support structure and arranged to roll along said at least one guide path, a locking device configured to prevent rotation of said rotary member in at least one direction and thus prevent manual adjustment of the seat base by an occupant in the at least one direction when locked and to permit rotation of said rotary member in the at least one direction and thus permit manual adjustment of the seat base by the occupant in the at least one direction when released, and an actuation device configured to release the locking device to permit rotation of the rotary member and thus permit manual adjustment of the seat base by the occupant in the at least one direction upon selective manual actuation of the actuation device by the occupant, and wherein the control device is adapted to enable the seat base to be translated towards its upright position along said at least one guide path without requiring actuation of a user control interface associated with the device, while preventing the seat base from being translated towards its reclined position without actuation of said user control interface.

16. A seat as claimed in claim 15, wherein the seat base and back rest are coupled together for movement with respect to a generally rigid outer shell, containing the seat base and back rest, from the upright state to the reclined state by forward sliding movement of the seat base and corresponding downward movement of the top edge of the back rest.

17. A seat as claimed in claim 16, wherein the back rest is rotatable about a substantially horizontal axis which is slidable along a first downwardly and forwardly extending guide path when the seat base moves from the upright state to the reclined state and wherein the seat base support structure is slideable along both the first guide path and a second downwardly and forwardly extending guide path when the seat moves from the upright state to the reclined state, and wherein the second guide path makes a lesser angle to the horizontal than the first guide path whereby the forward sliding movement of the seat base is accompanied by a slight downward tilting of the rear of the seat base, said control device being associated with at least one of said first and second guide paths.

18. A seat as claimed in claim 17, wherein the support structure comprises first and second link members each pivoted at one end to the underside of the seat base at respective locations spaced in the front-to-rear direction of the seat, the other ends of the link members being pivotable at respective locations a fixed distance apart and slidable along the first and second guide paths respectively.

* * * * *